US008483659B2

(12) United States Patent
Mahajan

(10) Patent No.: US 8,483,659 B2
(45) Date of Patent: Jul. 9, 2013

(54) METHODS AND SYSTEMS FOR RECOVERING LOST OR STOLEN MOBILE DEVICES

(75) Inventor: Manish Mahajan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 659 days.

(21) Appl. No.: 12/393,828

(22) Filed: Feb. 26, 2009

(65) Prior Publication Data

US 2010/0216429 A1  Aug. 26, 2010

(51) Int. Cl.
*H04W 12/06* (2009.01)
(52) U.S. Cl.
USPC ........ 455/411; 455/410; 455/556.1; 709/219; 340/5.52; 340/5.53
(58) Field of Classification Search
USPC ....... 455/411, 410, 556.1; 709/219; 340/5.52, 340/5.53
See application file for complete search history.

(56) References Cited

U.S. PATENT DOCUMENTS

| 5,418,519 | A  | * | 5/1995  | Hino et al. ............... 340/426.34 |
| 5,513,272 | A  | * | 4/1996  | Bogosian, Jr. ................ 382/116 |
| 6,104,922 | A  |   | 8/2000  | Baumann |
| 7,640,005 | B2 | * | 12/2009 | Matsumoto et al. .......... 455/411 |
| 2002/0194003 | A1 | * | 12/2002 | Mozer ........................ 704/270.1 |
| 2004/0203601 | A1 | * | 10/2004 | Morriss et al. ................ 455/411 |
| 2004/0224665 | A1 | * | 11/2004 | Kokubo ........................ 455/411 |
| 2005/0091338 | A1 | * | 4/2005  | de la Huerga ................ 709/217 |
| 2007/0032227 | A1 | * | 2/2007  | Chen ............................ 455/418 |
| 2007/0249322 | A1 | * | 10/2007 | Benco et al. .................. 455/410 |
| 2008/0070631 | A1 |   | 3/2008  | Kumar |
| 2008/0091823 | A1 | * | 4/2008  | Ito ................................ 709/224 |
| 2008/0120707 | A1 | * | 5/2008  | Ramia .............................. 726/5 |
| 2008/0167002 | A1 | * | 7/2008  | Kim et al. ..................... 455/411 |
| 2008/0320312 | A1 | * | 12/2008 | Duffus et al. ................. 713/189 |
| 2009/0075630 | A1 | * | 3/2009  | McLean ........................ 455/411 |
| 2009/0165125 | A1 | * | 6/2009  | Brown et al. ................... 726/21 |
| 2009/0253410 | A1 | * | 10/2009 | Fitzgerald et al. ............ 455/411 |

FOREIGN PATENT DOCUMENTS

WO   WO2007027065 A1   3/2007

OTHER PUBLICATIONS

International Search Report and Written Opinion—PCT/US2010/025493, International Search Authority—European Patent Office—Jan. 7, 2011.

\* cited by examiner

*Primary Examiner* — Jinsong Hu
*Assistant Examiner* — Qun Shen
(74) *Attorney, Agent, or Firm* — James T. Hagler

(57) ABSTRACT

To facilitate recovering lost or stolen mobile devices, methods and systems are provided that enable mobile devices to report information that can be used to locate the device and/or identify an unauthorized user. Owners can report the loss or theft of their mobile devices to a server which can transmit an anti-theft activation message. Reception of the anti-theft activation message prompts activation of a anti-theft software module may limit access to programs and data on the mobile device while allowing the normal use of the mobile device through a secondary user interface. Unbeknownst to unauthorized users, data related to the user and the device are collected and transmitted to a server. Collected data may include user biometric data and non-biometric data. User biometric data may be matched against biometric databases to identify the user. Non-biometric data may be used to help locate the mobile devices.

38 Claims, 14 Drawing Sheets

| | 600b | 600c | 600d | 600e | 600f | 600f |
|---|---|---|---|---|---|---|
| User | Date | Time | Location | Biometric Recorded | Biometric ID | Use |
| Owner | July 8, 2008 | 12:56PM | Washington D.C. | Fingerprint | BT0033245 | Call 555 1234 |
| Unknown 1 | July 10, 2008 | 21:09PM | Arlington, VA | Fingerprint | BT0044329 | Call 555 5456 |
| Unknown 1 | July 10, 2008 | 21:09PM | Arlington, VA | Voiceprint | BT0044330 | Call 555 5456 |
| Unknown 2 | July 14, 2008 | 13:34PM | Bethesda, MD | Retinal Scan | BT0087643 | Email john@qc.com |
| Owner | July 15, 2008 | 09:02AM | Washington D.C. | Fingerprint | BT0078653 | SMS 555 5678 |

FIG. 6

METHODS AND SYSTEMS FOR RECOVERING LOST OR STOLEN MOBILE DEVICES

FIELD OF THE INVENTION

The present invention relates generally to the field of telecommunications communications, and more specifically to methods and systems for recovering lost or stolen mobile devices.

BACKGROUND

With the popularity and ever increasing sophistication of personal communication devices, users employ their mobile device to perform more complex tasks. Thus, users are increasingly storing important and sensitive information on their mobile devices, such as social security numbers, PIN numbers, bank account numbers, contact information, etc. Therefore, the loss or theft of mobile devices can be devastating to their users.

The possibility that sensitive information is stored on mobile devices renders them attractive targets for theft, especially by identity thieves. Identity information, such as social security numbers and bank account information, can be criminally exploited, which can result in bad credit, criminal records and a host of other issues that may cost victims large amounts of money and time to rectify. Therefore, an ability to remotely disable mobile devices may not be enough to protect users from the misappropriation of their identities. It would be beneficial if lost mobile devices could be recovered and thieves of mobile devices identified and apprehended. In addition to intervening crime directly, the ability to locate, identify and apprehend thieves of mobile devices may create a deterrent effect, thereby reducing the theft of mobile device.

SUMMARY

The various embodiments provide methods and systems for recovering a lost or stolen mobile device while providing information that may allow authorities to identify a thief if the mobile device was stolen. Mobile devices may be registered with a service, such as a server-based service, to allow users to report the loss or theft of a mobile device. When a user reports the loss or theft of a mobile device, this status may be communicated to the mobile device via wireless data communication networks. In response, the notified mobile device may activate a anti-theft software module. The anti-theft software module may provide limited access to programs and data on the mobile device while collecting information about the unauthorized user and the device's surroundings, and transmitting the collected information to a server. Collected information may include biometric data about the unauthorized user or non-biometric data. When received at the server, such data may then be used to investigate the loss or theft of the mobile device.

The various embodiments also provide methods and systems for continuously collecting and transmitting user data, such as biometric and non-biometric data, to a anti-theft service database server. Such data may be stored and categorized to aid in investigating lost or stolen devices.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 6 is a data structure diagram of an embodiment data structure suitable for storing data received from a mobile device.

DETAILED DESCRIPTION

Figure 1:
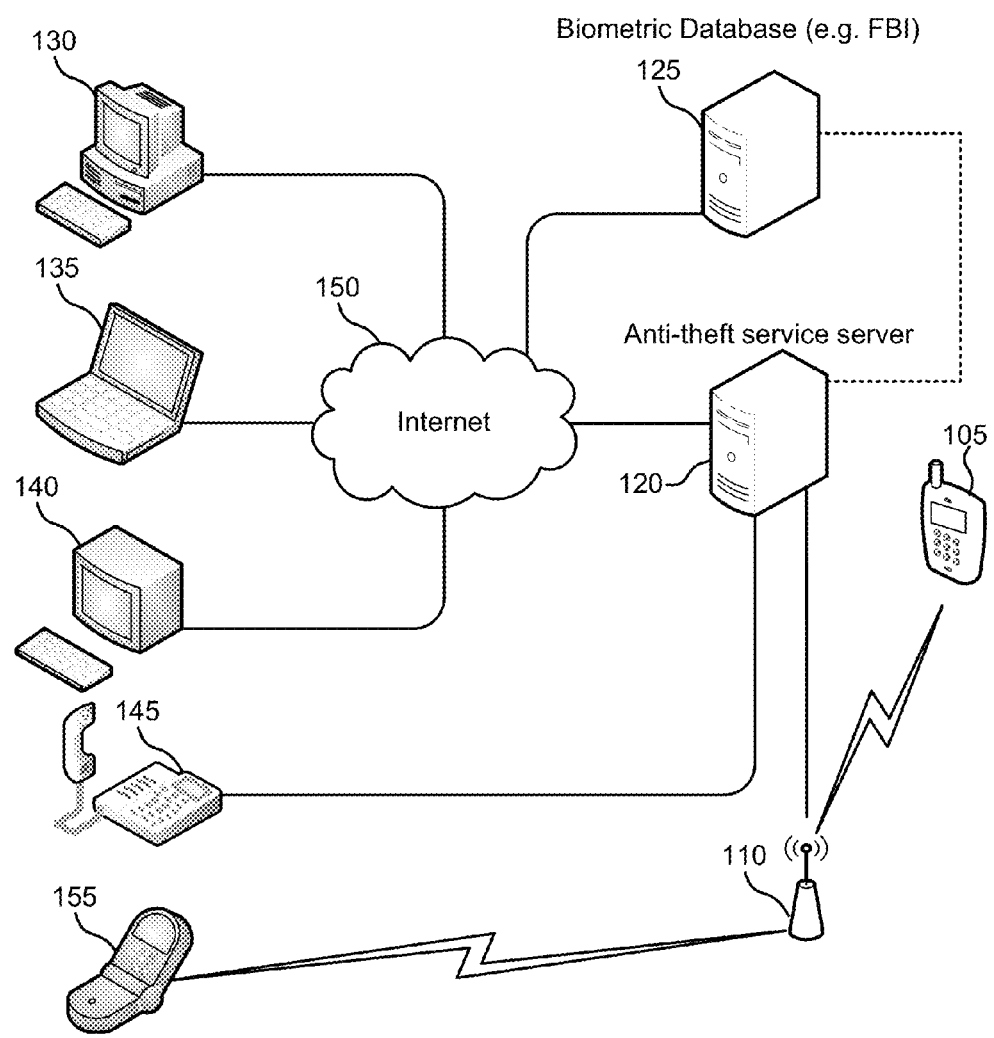
FIG. 1 is a system network diagram illustrating example connections and interrelations of components of the various embodiments.

In this description, the terms "exemplary" is used herein to mean "serving as an example, instance, or illustration." Any implementation described herein as "exemplary" is not necessarily to be construed as preferred or advantageous over other implementations.

As used herein, the term "mobile device" refers to any one or all of cellular telephones, personal data assistants (PDA's), palm-top computers, wireless electronic mail receivers and cellular telephone receivers (e.g., the Blackberry® and Treo® devices), multimedia Internet enabled cellular telephones (e.g., the iPhone®), wireless network transceiver cards for use in a personal computer, and similar personal electronic devices which include a programmable processor and memory as well as the capability to connect to a wireless network. The term may also encompass personal computers, such as a laptop computer or a desktop computer, with wired and wireless network transceiver circuits when used in the description of the various embodiments which may also be implemented on or with personal computers.

With the popularity and ever increasing sophistication of communication devices, users employ their mobile devices to perform increasingly more complex tasks. For example, mobile devices may now be used to pay for merchandise or to verify an owner's identification. Thus, users are storing more important and sensitive information on their mobile devices. For example, the information stored on mobile devices may include social security numbers, PIN numbers, bank account numbers, client names and contact information. Consequently, the loss or theft of such mobile devices can be devastating to their users.

The theft of a mobile device can be especially of concern because thieves may access the user's personal and identity information stored on the mobile device. Identity information may be misused in two ways. First, identity information may be traded like a commodity. For example, social security numbers or credit card numbers with Card Security Codes (CSC) may be sold to others. Second, identity information may be used to exploit the users' identity and credit. Personal information, such as the user's social security number and bank account data stored on a mobile device can be used to withdraw money from the user's accounts, open factitious accounts, launder money, write fraudulent checks, procured a loan to purchase real property, apply for driver's license, commit criminal activities, etc. Such misuse of personal information can result in bad credit, criminal records and a host of other issues the resolution of which may cost victims and society large sums of money and time. Consequently, it may not be enough to remotely disable a stolen mobile device if a thief cannot be identified and apprehended before there has been significant misuse of the information stored in the device. It may be useful to track the sale of identity data and identify assets purchased and criminal activities committed using identity obtained from a stolen mobile device. Therefore, there is a need for abilities to recover lost mobile devices and identify thieves of mobile devices so they can be apprehended. In addition to intervening crime directly, the ability to locate, identify and apprehend thieves of mobile devices may create a deterrent effect that could reduce the theft of mobile devices.

The various embodiments provide methods and systems for recovering lost or stolen mobile devices, as well as providing information related to an unauthorized user that can help authorities identify the thieves of stolen mobile devices. Such methods and systems may be implemented, for example, by a cellular telephone service provider in the form of an anti-theft service offered to mobile phone users. An anti-theft service may also be provided by a third party service company unconnected with the cellular telephone provider. In such a service, mobile phones may be registered when the user subscribes to the anti-theft service. When registering with such a service, the mobile device's telephone number and user identity information may be recorded in a server database sufficient to enable the service to communicate via wireless data networks with a particular mobile device reported lost or stolen. For example, users may provide the cellular telephone number of the mobile device being registered along with their name and contact information. Users may also provide or be provided with a password to enable the server to confirm that a loss report is being made by the authorized user of the mobile device.

Once registered, the anti-theft service may allow users to report the loss or theft of their mobile devices. For example, when registered mobile devices are lost or stolen, users can contact the anti-theft service provider to make a report about such loss or theft. Users may contact the anti-theft provider by using known communication systems and methods, such as by calling a designated call center, accessing an Internet website portal hosted by the service, or sending emails or facsimiles to the service. Users may be requested to enter or speak their password, or other authentication information, which the server can use to confirm their identity before receiving the loss report. The use of a password or authentication information can prevent unauthorized activation of the anti-theft service.

To protect important and sensitive data a mobile device may be configured by software to include a software module which when activated implements one or more of the embodiment methods to gather and report information about the present user as well as restrict access to certain information. For ease of reference, this software module is generally referred to herein as an "anti-theft software module." Such an anti-theft software module may either be pre-programmed in or downloaded onto the mobile device's memory via wired or wireless networks. The anti-theft software module includes the software instructions needed to implement one or more of the embodiment methods described herein with reference to FIGS. 4A-B, 5, 7, and 9-12. In overview, the anti-theft software module directs the functioning of the mobile device that an authorized user wishes to implement in the event the mobile device is stolen. Such anti-theft functioning may include limiting access to certain data (e.g., confidential or sensitive information) while gathering information about the present user that can be transmitted to a server to enable the mobile device to be recovered and a thief apprehended. Such anti-theft functioning may also include spoofing functionality, such as performing the functions without any visible indication, so that an unauthorized user cannot tell or otherwise be alerted to the fact that the mobile device is operating in the anti-theft mode. The anti-theft software module may be implemented or stored within the mobile device so that it cannot be removed, deactivated or altered by an authorized user.

The anti-theft software module may be inactive during normal operation, taking over functions of the mobile device only when activated by a command form the anti-theft service server. The mobile device may be configured by software to receive communications from the anti-theft service server related to the lost or stolen status of the device and, in response, activate the anti-theft software module. The mobile device may receive such activation communications from the anti-theft service server via any wired or wireless communication mechanism supported by and available to both the mobile device and the anti-theft service server. In a preferred embodiment, the anti-theft service server may communicate lost or stolen status information to a mobile device via a cellular data network communication. As a first example, the anti-theft service server may send a simple message service (SMS) message to a particular mobile device in which a code included in the message directs the mobile device to activate the anti-theft software. As a second example, the anti-theft service server may send an e-mail to a particular mobile device in which a code included in the message (such as in the e-mail message header) directs the mobile device to activate the anti-theft software. The mobile device may be configured by software to recognize an incoming anti-theft activation message and to activate the anti-software module in response.

Once activated, the anti-theft software module can direct the functioning of the mobile device to protect the authorized user's stored sensitive information while collecting data about an unauthorized user of the mobile device. This may be achieved by implementing a secondary user interface. Such a secondary user interface allows the mobile device to function in what appears to be a normal manner while clandestinely limiting access to programs and data on the mobile device and collect usage parameters. For example, when a mobile device receives an anti-theft activation message the device software module is activated which replaces the standard user interface with a secondary user interface. Through the secondary user interface, the unauthorized user may only have access to certain programs or databases on the mobile device, such as the telephone or email programs, so the device appears to function in the ordinary manner. The secondary user interface may also display fake databases, such as a fake address book, to deceive a thief into thinking that the mobile device is functioning normally. In this manner, a thief is more likely to leave the mobile device on and in a location where it can communicate with wireless networks so the anti-theft software module can gather and transmit information to an anti-theft service database server or another central database server.

At the same time and unbeknownst to the unauthorized user the anti-theft software module may cause the mobile device to collect and store information that can be used by authorities to locate the mobile device and identify an unauthorized user. Such collected information may include biometrics information, such as fingerprint or voiceprint, and non-biometric information, such as Global Positioning System (GPS) location data, dialed telephone numbers, accessed cellular base station identifier, and dates/times of telephone calls. The mobile device may also collect and store non-biometric information regarding the surroundings of the mobile device, such as photographs of the surrounding environment and recordings of ambient noise. The collected bio-metric and non-biometric data may then be transmitted by the mobile device (under control of the anti-theft software module) to an anti-theft service server or a anti-theft service database server so the information can be used by authorities to identify, locate and apprehend unauthorized users of the mobile device.

Biometric information that the mobile device collects and reports may include, but is not necessarily limited to, fingerprint data, voice recordings (e.g., may be used to generate a voice print), facial images, retinal or iris scans, palm scans and deoxyribonucleic acid (DNA) pattern recognition.

Non-biometric information that the mobile device collects and reports may include the date, time and location of use of a mobile device, and the type of use of a mobile device such as an email, SMS or phone call, ambient noise, surrounding photos, etc.

Alternatively, in a mobile device equipped with biometrics access modules, such as fingerprint access modules, when reported as lost or stolen by the owner, the mobile device may completely deny access to the user without switching to a secondary user interface. In such cases, a report that a mobile device is lost or stolen may activate the anti-theft software module. When incorrect fingerprint data is inputted into the mobile device, the mobile device may display an "access denied" notice. Since the anti-theft software module is activated, every fingerprint input is collected and transmitted unbeknownst to the unauthorized user.

When a mobile device is reported lost and the anti-theft software module is activated but the device is not being used by others (i.e., it is merely misplaced), the anti-theft software module may cause the mobile device to collect and store location-specific information, such as location coordinates provided by a GPS receiver, ambient noise using the microphone, and photos using a camera. Such collected information can similarly be transmitted to an anti-theft service database server or another central database server where it can be used to locate the mobile device.

The anti-theft software module may be configured to transmit collected information continuously or periodically. For example, the anti-theft software module may collect and transmit biometric and non-biometric data continuously so as to provide a continuous record of usage and location. This operational mode may be useful when authorities are closing in on the device's location. As another example, the anti-theft software module may collect information that is transmitted only periodically (e.g., once per hour) in order to conserve battery power. This operational mode may be useful when authorities are unable to locate the device's location immediately or they desire to collect more information about the users over an extended period of time (e.g., to gather information regarding a cell phone theft ring). The anti-theft software module may be configured to receive commands via wireless communication networks to switch between continuous and periodic reporting modes, as well as to receive a schedule for reporting data.

The bio-metric and non-biometric information transmitted by the mobile device to an anti-theft service server or a anti-theft service database server can then be used by the service provider and/or authorities to locate the mobile device and help apprehend thieves. If GPS data is reported, this location information can be used to determine the present location of the device. If GPS data is not reported but ambient information, such as noise or photographs, is reported, an investigator may use such information to surmise where the mobile device may be. If biometric information from an unauthorized user, such as a fingerprint, photograph or voice-print, is reported, such information may be compared to central database repositories for such biometric information to determine if there is a match. For example, if a fingerprint is reported by a mobile device, that fingerprint may be compared to a database of known criminal fingerprints to determine if there is a match. In this manner, the current user of a missing mobile device may be determined. Thus, in a mobile device equipped with both a GPS receiver (as will be the case for most mobile devices in the future) and a fingerprint scanner, the anti-theft software module may provide authorities with the location and identity of the thief who stole a mobile device, as well as providing a log of usage and locations that may serve as criminal prosecution evidence.

In a further embodiment, if authorities are unable to recover the mobile device, the anti-theft software module may be instructed to delete all programs or data stored on the device. The anti-theft software module may also be configured to completely shutdown the mobile device or otherwise make it unusable. Messages to delete data and/or deactivate the mobile device may be transmitted to device in the same manner as used to transmit anti-theft activation messages. The anti-theft software module may be configured to receive and recognize messages, include verifying such messages to confirm that they are authentic prior to deleting data or deactivating.

As described above, the anti-theft software module may be activated remotely via messages sent by a wireless communication network. Users of mobile devices may remotely activate the anti-theft software module by contacting the anti-theft service provider and identifying the specific mobile device that is missing (e.g., by providing its telephone number). For example, users may access a personalized website through which they can identify and report the loss or theft of their mobile devices to the anti-theft system provider. Users may also call the anti-theft service provider to report the loss or theft of their mobile devices, such as by speaking to an operator or to a voice-recognition software system. Once the anti-theft service provider is informed that a particular mobile device is lost or stolen, it transmits the anti-theft activation instructions to the identified mobile device to cause it to activate the anti-theft software module.

A mobile device may also be configured to recognize when it is potentially stolen and implement the anti-theft software module in the absence of an activation instruction from the anti-theft service provider. For example, if the mobile device detects an attempt to access a mobile device by an unauthorized user, the mobile device may locally activate the anti-theft software module. For example, in mobile devices equipped with fingerprint access control modules (i.e., finger print sensors and recognition software) the anti-theft software module may be activated when there is an attempt to access the mobile device but the fingerprint is not recognized as that of an authorized user. In such situations, the unauthorized user's fingerprint and other usage data may be collected and stored so that the collected information can be transmitted to an anti-theft service server or another central database server if it subsequently receives an anti-theft activation message (e.g., when the owner reports the mobile device missing to the anti-theft service). Collected information may retained in memory if it is not able to establish a network connection for later transmission when the mobile device establishes access to a communication network.

In an embodiment, a mobile device equipped with the anti-theft software module may also be configured to continuously collect and store usage parameters, including biometric and non-biometric data. Such data may be collected every time a user, whether authorized or unauthorized, uses the mobile device. The collected data may be transmitted to a server where it may be stored. Usage parameter data that is continuously collected and stored may be compiled into separate biometric and non-biometric databases which may later be used to locate a lost or stolen device or to identify the thieves of mobile devices. For example, a mobile device might be stolen by an acquaintance of an authorized user. If the acquaintance had used the mobile device before stealing it, his or her biometric and non-biometric data would have been collected and stored during that prior use. This stored data may later be used to identify the acquaintance as the thief of the mobile device when it is reported stolen by comparing the current use data reported by the anti-theft software module to the prior use data stored in the database.

Additionally, users may be provided access to usage parameter data that is continuously collected and stored. Such data may be presented to the users in a tabulated format via a website portal, for example. Such data may provide users with a complete use history of their mobile devices. The use history data may also provide information to assist in investigating or locating a lost or stolen mobile device. For example, users may be able to listen to the ambient noises recorded and view the photos taken when users were last in possession of their mobile devices to obtain clues about the circumstances leading to its loss. Such clues may lead investigators to locating or identifying the thief of a mobile device.

FIG. 1 is a communication network diagram illustrating components of an embodiment system used for recovering lost or stolen mobile devices and identifying and apprehending the thieves of stolen mobile devices. As mentioned above, the various embodiments may be implemented by an anti-theft service provider which may provide an anti-theft service database server 120 coupled to the Internet 150 and configured to communicate via a wireless communication network. As mentioned above, the anti-theft service provider may be the cellular service provider or a third party service provider. The anti-theft service provider may enable users to register their mobile devices 105 with an anti-theft service database server 120. User registration information may be received via Internet or telephone communications and stored in the anti-theft service database server 120. For example, users may register their mobile devices 105 when they buy them at a store or a cellular service provider facility. Alternatively, users may register their mobile devices 105 with the anti-theft service database server 120 at any time after purchase. Users may contact the anti-theft service database server 120, for example, via a network 150, such as the Internet, from personal computing devices 130, 135, 140, or by placing a call via telephone 145, 155 to an operator or a voice-recognition system (not shown) provided by the anti-theft service provider.

Once their mobile devices have been registered with the anti-theft service database server 120, users may access the server to review/update their registration information and to report a loss or theft of their mobile devices 105. During the registration process the anti-theft service provider may assign personal accounts to users along with authentication information, such as a personal identification number (PIN) or password, which the anti-theft service database server 120 can use to authenticate each user. In order to access their accounts, users may be required to provide their authentication information to the anti-theft service database server 120. For example, users may be required to provide a PIN or password before accessing their accounts. Alternatively or additionally, users may be required to provide verified biometric information, such as a fingerprint or voiceprint, which the anti-theft service database server 120 can compare to a verified template to authenticate users before enabling them to access their accounts. Once access to their account is established, users may be allowed to view or update their registration information or report the loss or theft of their registered mobile devices 105. A simple menu of options may be provided on a website hosted by the anti-theft service server database 120 to facilitate receiving user information or reporting a lost or stolen mobile device.

Users may log into the anti-theft service database server 120 to report a lost or stolen mobile device 105 using personal computers 130, 135, 140 coupled to the Internet 150 by wired or wireless communications networks. For example, users may employ a PC computer 130, laptop 135 or a computer terminal 140 to log into an Internet website portal hosted by the anti-theft service server database 120 through the Internet 150. Users may also communicate with the anti-theft service provider using a telephone 149 or a cellular phone 155 via a cellular telephone base station 110.

The anti-theft service database server 120 is configured via network connections or internal circuitry to be able to communicate with registered mobile devices 105 via a wireless communication link, such as a via a cellular data communication link through a cellular ground station 110. When a user informs the anti-theft service database server 120 that a mobile device 105 is lost or stolen, the anti-theft service database server 120 can communicate with the mobile device 105 via the wireless communication link, such as to transmit an anti-theft activation message or other control command. In a preferred embodiment such communications are transmitted via a cellular data network via a cellular ground station 110, but the communication may also be accomplished via other wireless data networks, such as WiFi, WiMax, etc., via a wireless access point. In a similar manner, mobile devices 105 can communicate with the anti-theft service database server 120, such as to transmit data collected by the mobile device 105.

The anti-theft service database server 120 may also communicate with other servers 125 via the Internet 150 or other network, such as for example, servers hosting databases of biometric information. One such biometric database is the fingerprint registry database maintained by the Federal Bureau of Investigation (FBI). Communications between the anti-theft service database server 120 and biometric database servers 125 may be via the internet 150 or through direct secured communication lines as illustrated with a dashed line in FIG. 1. The anti-theft service database server 120 may relay received user biometric information to a biometric database server 125 where the received biometric information can be compared to records within the database to determine if there are any possible or likely matches. If a match is found, the biometric database server 125 may transmit that information back to the anti-theft service database server 120 or directly to appropriate authorities, such as the local police or a responsible FBI unit. If the biometric information of an unauthorized user matches that of a known criminal, that individual may then be identified, tracked and apprehended by law enforcement personnel so the mobile device 105 may be recovered. For example, in mobile devices 105 registered with the anti-theft service database server 120 that are equipped with a fingerprint sensor and GPS receiver, the identity of unauthorized users and their locations may be quickly determined from the information transmitted by the mobile device 105. The authorities may then swiftly find and apprehend the unauthorized users. By quickly apprehending a mobile device thief, misappropriation and unauthorized use of sensitive information on the mobile device 105 can be limited or avoided.

Figure 2:
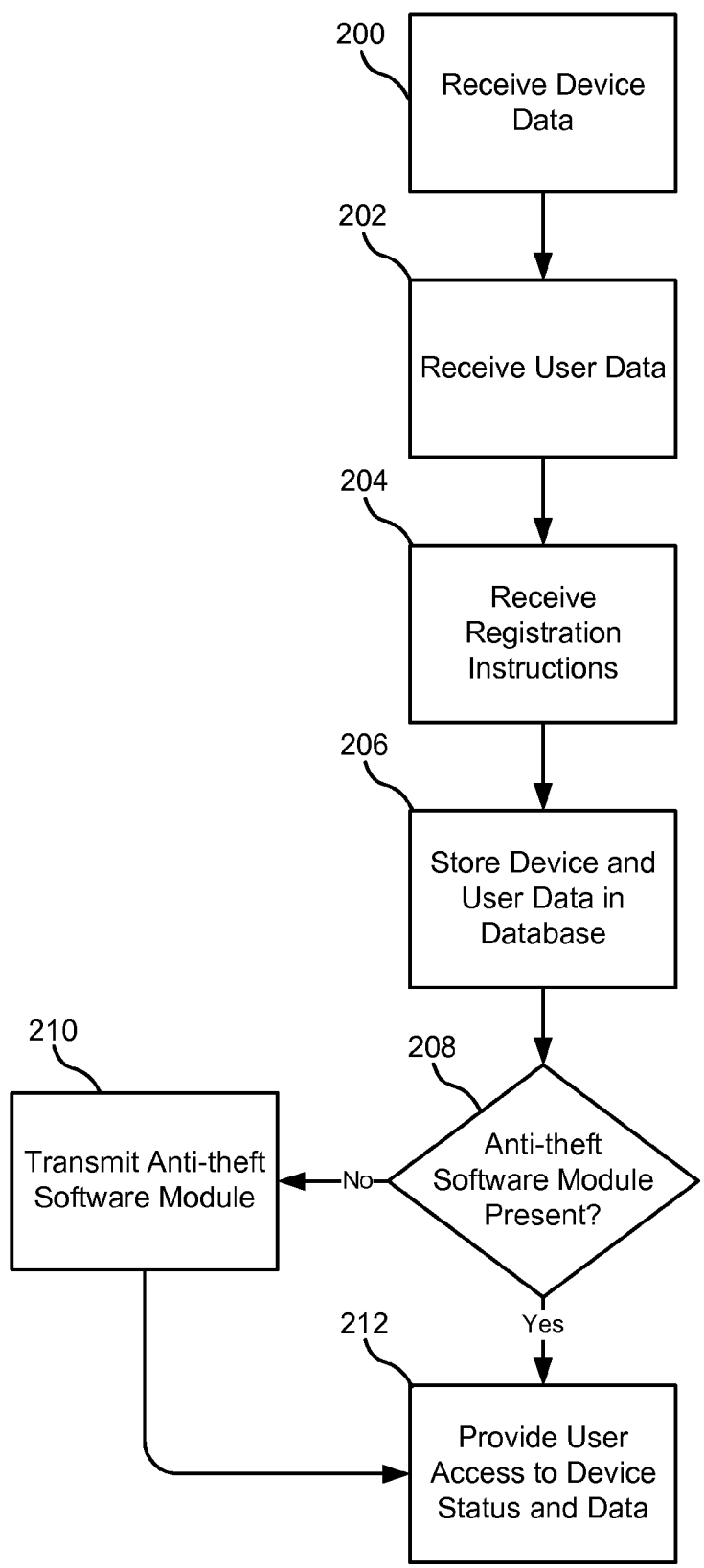
FIG. 2 is a process flow diagram of an embodiment method suitable for registering owners of mobile devices.

FIG. 2 illustrates an embodiment process flow diagram suitable for registering users' mobile devices with an anti-theft service provider. As discussed above, an anti-theft service provider may host an anti-theft service database server 120 coupled to the Internet 150 and configured by software to receive and store registration information about the users and their mobile devices 105. During the registration process, the database server 120 receives information about the mobile device and the user, steps 200 and 202. Information gathered and stored in the anti-theft service database server 120 during the registration process allows the server to associate a particular mobile device 105 to a corresponding user as well as communicate with the mobile device 105 via a wireless network. Thus, registration information stored in the anti-theft service database server 120 will typically include user and device data. User data received by the anti-theft service database server 120 in step 202 may include the user's name, address, social security number, anti-theft service account number, PIN and/or password, security questions, and other authentication information (e.g., a biometric template). Device data received by the anti-theft service database server 120 in step 200 may include the cellular telephone number of the mobile device 105 and serial numbers (e.g., MAC ID) or any other identifiable parameter unique to the registered mobile device 105. The anti-theft service database server 120 may also receive user settings and other instructions to register the mobile device 105 to the user, step 204. The anti-theft service database server 120 then stores the received information in a database, thereby registering the mobile devices 105 to the user.

Once users and their mobile devices 105 are registered, the anti-theft service database server 120 may determine whether the mobile device 105 includes a anti-theft software module 120, test 208. If the anti-theft software module is not pre-installed on the mobile device, (i.e., test 208="No"), the anti-theft service database server 120 may transmit the anti-theft software module to the mobile device 105 for installation, step 210. Alternatively, the anti-theft software module may be provided in a tangible storage medium, such as a compact disc, memory card or integrated circuit which can be installed into the mobile device 105.

With registration complete, the anti-theft service database server 120 may provide users access to a personalized website portal, for example, through which users may view and/or update their registration information or view information regarding their use of the mobile device 105, step 212. In addition to viewing data about the use of the mobile device 105, users may employ the website portal to report the loss or theft of their mobile devices 105.

Since users may desire to sell their mobile devices 105 after they have been registered with the anti-theft service database server 120, an embodiment permits switching mobile device registrations to new owners. To allow the purchaser of a used mobile device to use device and receive the benefits of the anti-theft service, the previous user's association with the mobile device 105 must be cancelled and the new user registered with the anti-theft service database server 120. Such an exchange of registration information may be done either at a central location or by the users themselves. If the registration exchange is done at a central location, the old and new owners may take the mobile device 105 to the location, such as a cellular phone store, to have the staff there perform re-registration steps. Alternatively the new and old owners of the mobile device 105 may access the anti-theft service server 120 by, for example, logging into a hosted website or by making a phone call. In the re-registration process the previous owners' association with the particular mobile device is cancelled and the new owner completes the registration process much like a new registration except that there would be no need to re-enter the mobile device identification information. During this process the new owner may select or receive identification credentials, such as a PIN or password for use in subsequent communication with the anti-theft service server 120. Upon cancellation of the previous owner's registration, the previous owner may no longer have access to information about the mobile device 105.

Figure 3:
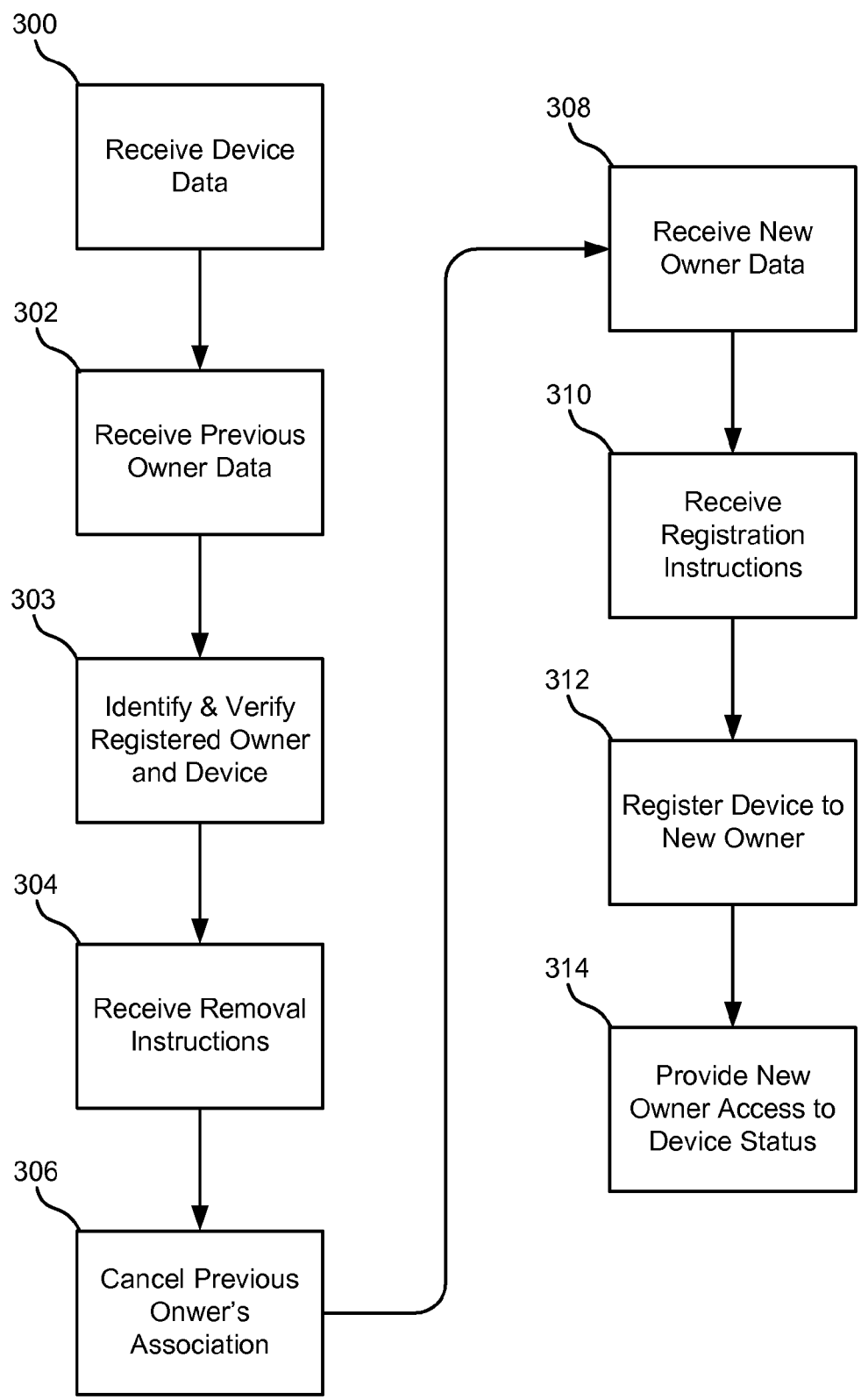
FIG. 3 is a process flow diagram of an embodiment method suitable for registering a new owner of a pre-owned mobile device.

FIG. 3 is a process flow diagram illustrating an embodiment method for re-registering a mobile device 105 to a new user in an anti-theft service database. To log into the anti-theft service database server 120, the old user enters the necessary device identifying data, step 300, and personal identifying/authenticating information, step 302. The received data may be used by the anti-theft service database server 120 to locate the mobile device's records in the database and verify the previous owner's identity (e.g., by confirming a PIN or password), step 303. Once the old user is verified, the anti-theft service server 120 may present the user with a webpage or menu screen including an option to record a sale of the mobile device. For example, a radio button may be provided on the webpage menu screen which the user can click on to transmit a request to remove the old user's registration information. Such an option may be prompt a confirmation pop-up window to allow a user to confirm the desire to remove his/her information from the database. Once confirmed, the response to the webpage menu screen is received by the anti-theft service server 120 as an instruction to remove the previous owner from the database, step 304. In response the anti-theft service server 120 may cancel the association of the previous owner with the mobile device 105, step 306. After the previous ownership of the mobile device 105 is cancelled, the new owner may be prompted with a webpage menu screen to enter personal identification information. When the new owner's information is received by the anti-theft service database server, step 308, the anti-theft service server 120 may record the information in the database and establish a new association between the mobile device 105 and the new owner, such as by linking the two database records via a common index key. Upon receipt of instructions to register the new owner, step 310, the anti-theft service database server 120 stores the updated user and device records in the database, thereby registering the mobile device 105 to the new owner, step 312. Once registered, a new owner may access a website to view the mobile device registration of recorded usage or reporting the lost or theft of their mobile devices 105, step 314.

Figure 4:
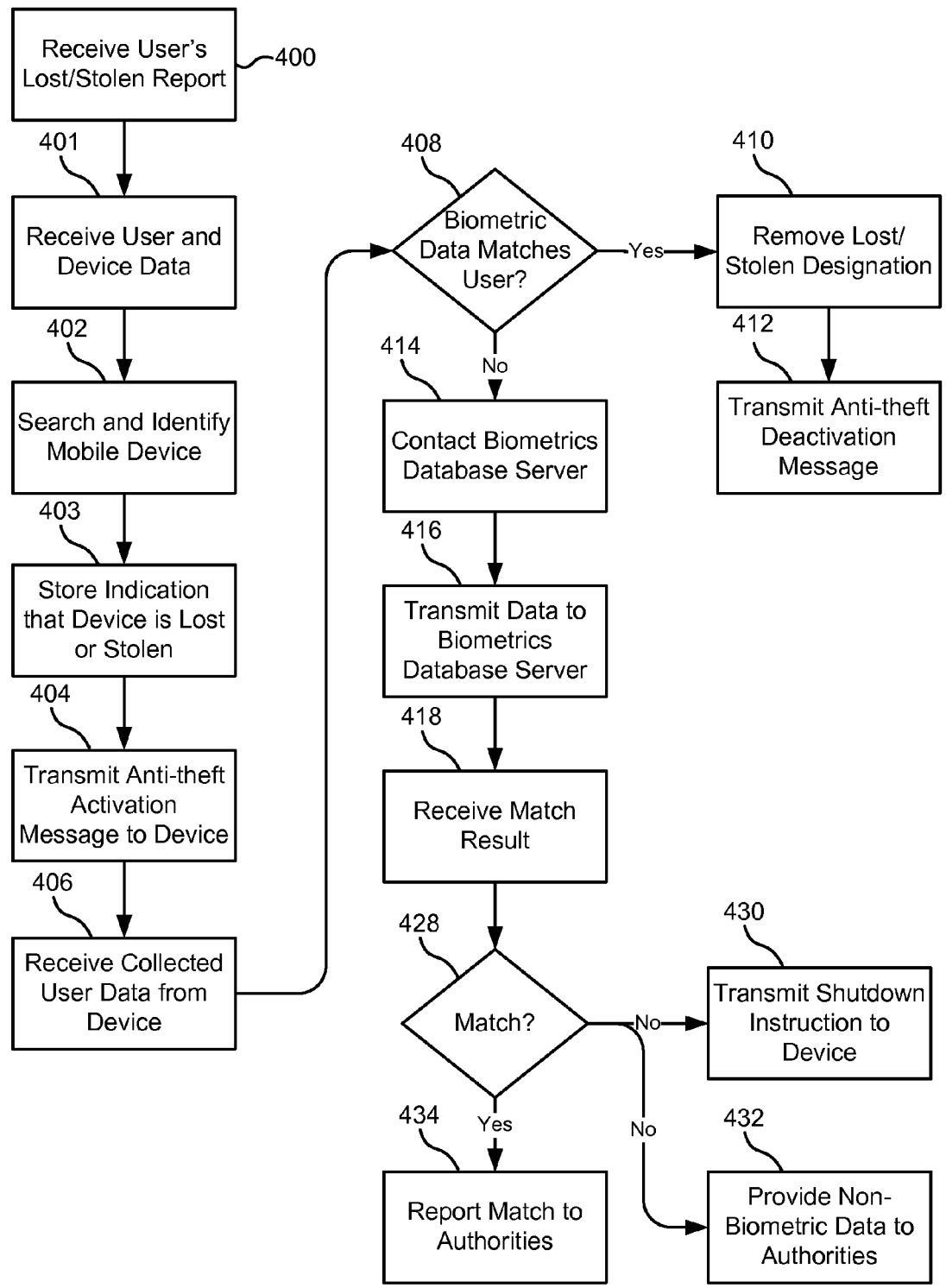
FIG. 4 is a process flow diagram of an embodiment method suitable for implementing protective measures for lost or stolen mobile devices.

When a mobile device 105 is registered to a user, the user can report the loss or theft of the user's mobile device 105 to the anti-theft service database server 120 at any time. FIG. 4 is a process flow diagram illustrating example steps that the anti-theft service database server 120 may implement upon receiving a report of a loss or theft of a mobile device 105. Users may inform the anti-theft service database server 120 about the loss or theft of their mobile devices 105 by accessing a website hosted by the anti-theft service server 120 or by calling the anti-theft service provider to speak to an operator or voice-recognition system. The report of a lost or stolen mobile device 105 is received by the anti-theft service database server 120, step 400. As part of this report the anti-theft service database server 120 also receives user and mobile device 105 identifying data, step 401, by which the anti-theft service database server 120 can identify the lost or stolen mobile device 105 within the registration database, step 402. The anti-theft service database server 120 may update the data record for the identified mobile devices 105 to indicate the device is lost or stolen, step 403. This indication may be in the form of a status flag stored in the data record or more information regarding the reported loss, such as the date and time of the report, circumstances concerning the loss, etc. The anti-theft service server 120 may then formulate and transmit an anti-theft activation message to the designated mobile device 105 directing the device to activate the anti-theft software module, step 404. After sending the anti-theft activation message, the anti-theft service database server 120 may begin to receive data from the mobile device 105, including user biometric data and non-biometric data, step 406. The information may be stored by the anti-theft service server 120 in a separate database or data file as it is received by the anti-theft service server 120. If biometric data is received, the anti-theft service database server 120 may compare the received biometric data to biometric data stored in a database to determine whether the current user is an authorized user of the mobile device, test 408. If the received biometric data matches biometric data of an authorized user (i.e., test 408="Yes"), the anti-theft service database server 120 may update the data record for the mobile device to remove the lost or stolen designation, step 410, and transmit an anti-theft deactivation message to the mobile device 105 to deactivate the anti-theft software module, step 412. When the mobile device 105 deactivates the anti-theft software module the device can be used in the normal manner. Alternatively, the lost or stolen designation may only be changed by the owner, such as for example, by communicating with the anti-theft service server 120 entering commands via a website portal, or by taking the mobile device 105 to a central location, such as an anti-theft service provider store.

If the received biometric data does not match biometric data of an authorized user (i.e., test 408="No") the anti-theft service database server 120 may contact a biometric database server 125, step 414, and transmit the collected biometric data to it, step 416. The biometric data may be analyzed by the biometric database server 125 and the results are transmitted to and received by the anti-theft service database server 120, step 418. If the results indicate that a match is found, (i.e., test 428="Yes"), the anti-theft service server 120 may send the results to the appropriate authorities (e.g., local police), step 434. If the mobile device 105 is equipped with a Global Positioning System (GPS), the coordinates and location of the mobile device 105 may also be received by the anti-theft service database server 120 in step 406. Such GPS coordinate information may also be provided to the appropriate authorities in step 434 in combination with the identity of the unauthorized user to enable the authorities to find the mobile device 105 and track any illegal uses of the mobile device 105.

If results of the biometrics database search produced no matches (i.e., test 428="No)," the anti-theft service database server 120 may send instructions to the mobile device 105 to shutdown or deactivate, step 430. By shutting or deactivating the mobile device 105, the user is protected from misappropriation of personal data and from charges that may result from unauthorized use of cellular communications. In the event this command is sent and implemented, the mobile device 105 may no longer be usable and all access to data and programs on the device will be restricted or all data may be destroyed. Alternatively, if the results of the biometric search produce no match (i.e., test 428="No"), the non-biometric data collected by the mobile device 105 and received by the anti-theft service database server 120 may be provided to the authorities for further investigation. For example, if the mobile device 105 is equipped with a camera, the anti-theft service database server 120 may receive photographs taken randomly from the surrounding environment of the mobile device 105 without the knowledge of the unauthorized user. Such data may be used to further advance investigations towards finding the lost mobile device 105 and/or apprehending the thief.

In an embodiment, mobile devices 105 registered with an anti-theft service provider may be configured with software to continuously collect and transmit information about all uses of the mobile device 105. In such a scenario, collecting and transmitting data about the use of the mobile device 105 is conducted without receiving an anti-theft activation message. Thus, the collection and transmission of data may occur even when the mobile device 105 is not reported lost or stolen. For example, if the mobile device 105 is equipped with a biometric access module, such as a fingerprint scanner, the mobile device 105 may collect and transmit biometric data from every person who uses the mobile device 105. As discussed above, such data may be useful to users tracking usage of their mobile devices and, in some circumstances, locating lost or stolen mobile devices.

Figure 5:
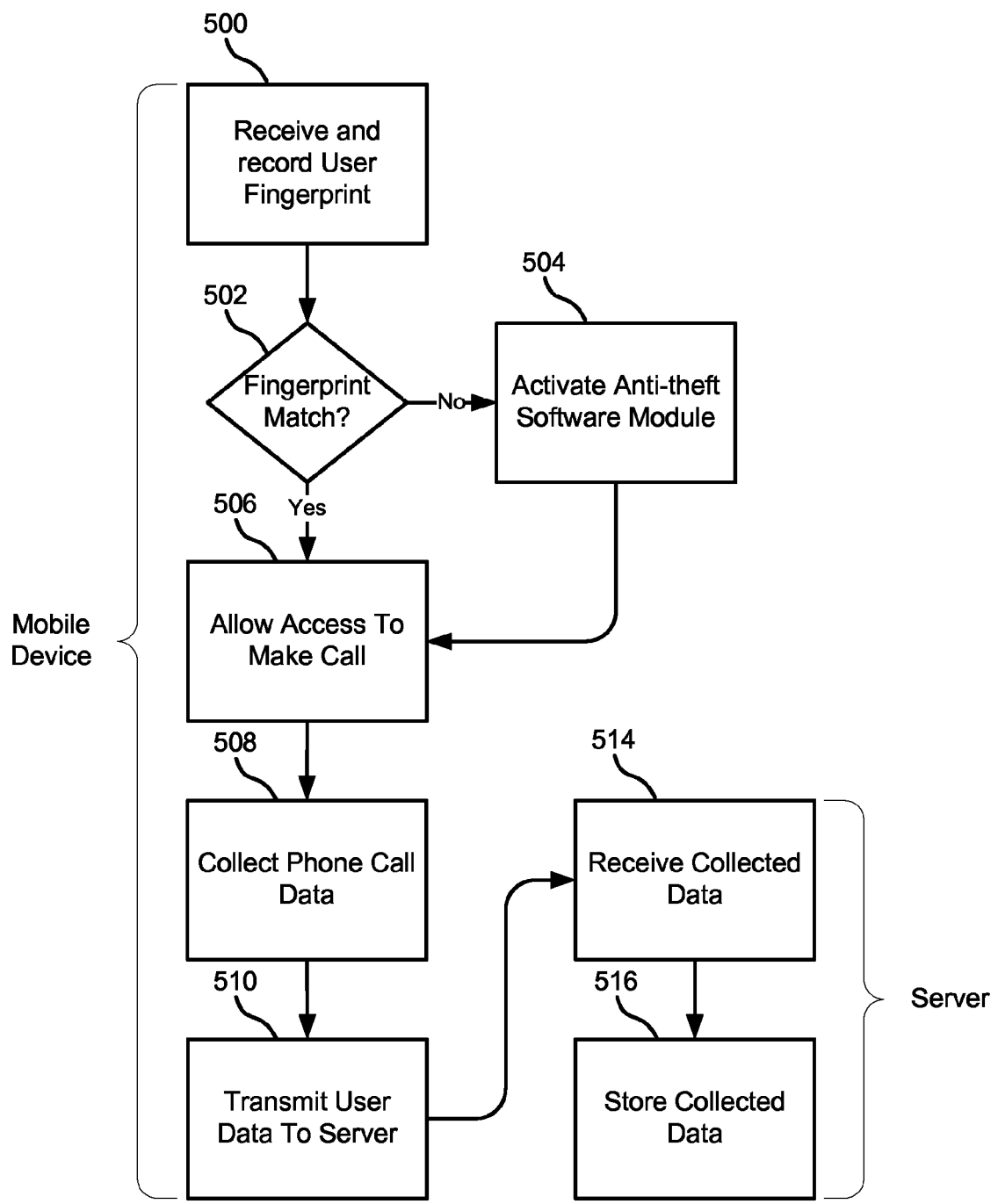
FIG. 5 is a process flow diagram of an embodiment method suitable for implementing automatic recording of all accesses to a mobile device.

FIG. 5 is a process flow diagram illustrating an exemplary embodiment method suitable for implementing continuous collection and transmission of data by a registered mobile device 105 equipped with fingerprint access module. In a mobile device 105 equipped with fingerprint access module, the fingerprint of the user is imaged ("scanned") when the user slides a finger over a fingerprint scanner. Once the mobile device 105 receives and record the user's fingerprint, step 500, the mobile device processor (or a processor associated with fingerprint access module) compares received fingerprint to the user's previously stored reference fingerprint to determine whether there is a match, test 502. If the received fingerprint data matches the reference fingerprint (i.e., test 502="Yes"), the user may be given access to all programs and data on the mobile device 105, such as making a call, step 506. The components, circuitry and functioning of fingerprint access modules are commercially available and well known in the electronic arts.

However, if the received fingerprint does not match the master fingerprint (i.e., step 502="No") the mobile device processor may activate the anti-theft software module, step 504. Activation of the anti-theft software module may result in denying the user access to certain programs and data and allowing access to only basic functions of the mobile device 105, such as the phone or email services. By denying access to sensitive data, the owner of the mobile device is protected from unauthorized use or misappropriation of the data if the current user is a thief. An authorized user can regain access to such blocked data and programs simply by rescanning his/her finger over the fingerprint scanner. The unauthorized user of the mobile device 105 may still be allowed to make a phone call, step 506. Enabling cell phone operation to continue for user's whose fingerprints are not recognized enables users to allow others to borrow their mobile device, and encourages thieves to continue to use the mobile device while the biometric and non-biometric data are gathered. The call details for both an authorized and unauthorized user may be collected, step 508. The collected fingerprint of the users and the call details are then transmitted to the anti-theft service database server 120, step 510. The anti-theft service database server 120 receives the collected data, step 514, and stores the data in a database record corresponding to the reporting mobile device, step 516.

FIG. 6 illustrates an example data structure suitable for storing and organizing data collected by the mobile device 105 and transmitted to the anti-theft service database server 120. The collected data may be stored within the mobile device 105 and/or it may be transmitted to and stored in a server, such as the anti-theft service database server 120. The collected data may be organized in a data table 600 which may include information about the User using the device 600*a*, Date of the use 600*b*, Time of the use 600*c* and Location of the use 600*d*, the type of Biometric data Recorded 600*e*, a Biometric ID 600*f* which can be used for searching the biometrics database, and the type and details of the Use 600*f* of the mobile device 105. In an example shown in row 604, on Jul. 8, 2008, at 12:56 PM, the owner of the mobile device 105 made a phone call from Washington, D.C. to the phone number 555-1234. In this particular use the owner's fingerprint was recorded and the Biometric ID number BT0033245 was assigned to the fingerprint data. The assigned Biometric ID may later be used to retrieve stored biometrics data about the caller or the call. In another example shown in row 606, an unauthorized user made a phone call on Jul. 10, 2008 at 21:09 PM from Arlington, Va. to the phone number 555-5456 at which time the mobile device 105 recorded the user's fingerprint. If the mobile device 105 is not equipped with a fingerprint access module, the mobile device 105 may record the user's voice in the form of a sound recording or a voiceprint, as shown for example in row 608. The mobile device 105 may also collect more than one type of biometric data from a user. For example, both a fingerprint and voiceprint may be collected from the same user during one use, as shown in rows 606 and 608 which record biometric data collected during the same call. In an embodiment users may later access such data via, for example, an Internet website portal hosted by the anti-theft service server 120 which can display the data table 60.

Mobile devices 105 may be configured by the anti-theft software module to receive instructions from the anti-theft service database server 120, to protect user data by limiting access of unauthorized users, collect biometric and non-biometric data, and transmit the collected data to the anti-theft service server 120 when the mobile device 105 is lost or stolen. The anti-theft software module may be pre-installed on the mobile device 105 when it is sold or manufactured, may be installed in the mobile device when it is registered with an anti-theft service provider, or may be downloaded into memory "over the air" via a wired or wireless data networks. The anti-theft software module may take over the basic operation of the mobile device 105 to provide a limited set of functionality to an unauthorized user while collecting biometric and non-biometric data. In this regard, the anti-theft software module may function in conjunction with a secondary user interface or may include the secondary user interface as part of the module itself. Alternatively, the anti-theft software module may reconfigure the settings of the mobile device 105 such that the mobile device software performs the desired functions. Additionally, the anti-theft software module may include the addressing information for transmitting collected data to the anti-theft service database server 120. For example, the IP address for the site to which collected data is to be transmitted may be included within the anti-theft software module instructions. The anti-theft software module may also be configurable in accordance with user selected settings. For example, user selected settings may include specific data files or records which are to be protected from unauthorized access, programs and functions which may be available to an unauthorized user, conditions for returning the mobile device to normal operation, etc. The anti-theft software module may also include dummy files and images which may be implemented in order to make the mobile device appear to be functioning in a normal manner even while biometric and non-biometric data is being collected.

Since the anti-theft software module is a key element for providing the ability to locate a lost or stolen mobile device 105 as well as potentially apprehend a thief, it may be configured and stored within the mobile device so that it is not easily defeated. For example, the anti-theft software module may be stored or implemented within the operating system or basic input/output software (BIOS). In this manner, the anti-theft software module cannot be removed by deleting files or reformatting memory. As another example, the anti-theft software module may be implemented in firmware within the mobile device processor(s). As a third example, the anti-theft software module may be protected by digital signatures with the mobile device operating system configured to require a validated copy of the module in order for the operating system to function at all. By so protecting the anti-theft software module from tampering and including the address for the anti-theft service database server 120, the a lost or stolen mobile device 105 should always be able to report its collected data.

Figure 7:
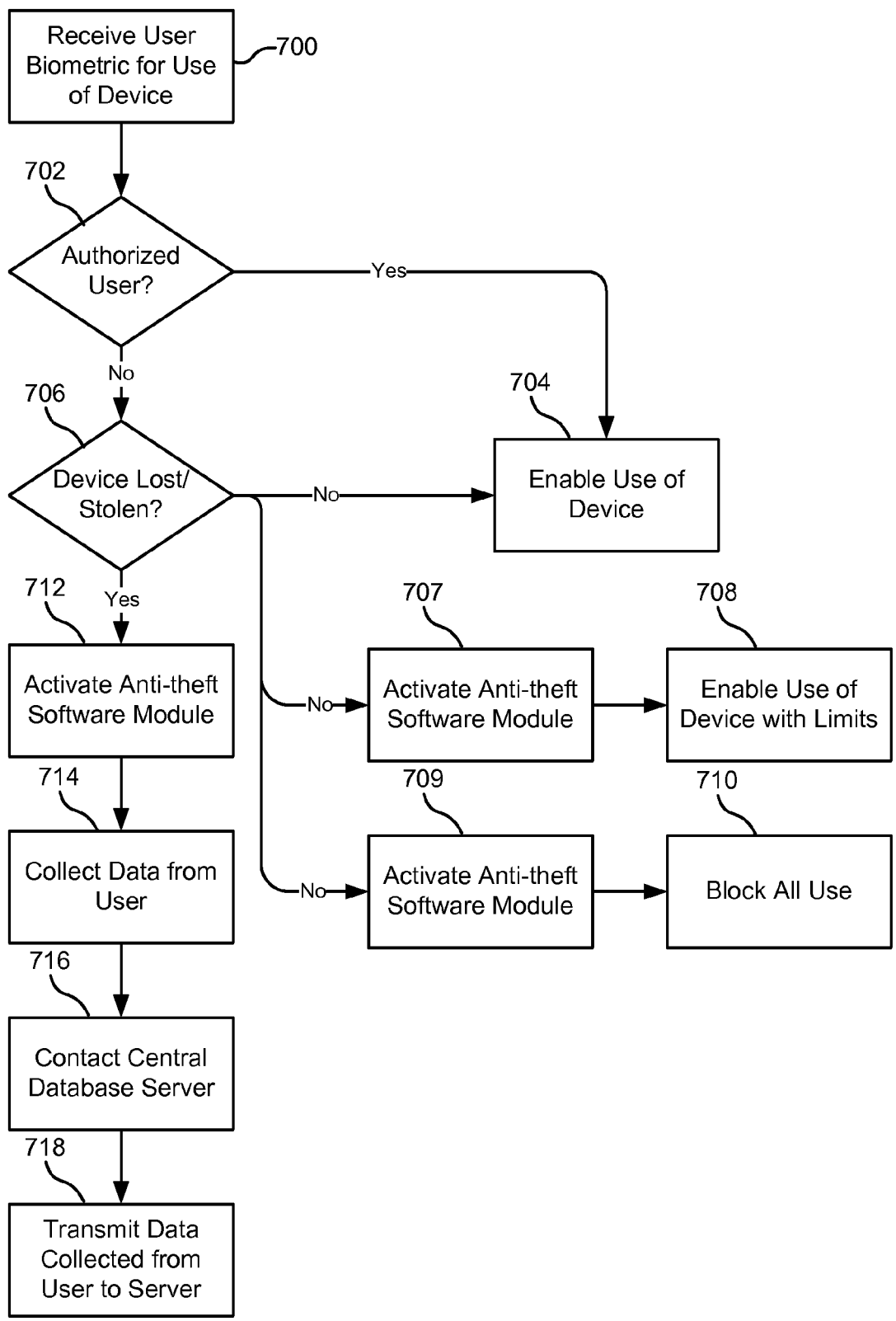
FIG. 7 is a process flow diagram of an embodiment method suitable for collecting and transmitting data using a mobile device.

FIG. 7 a process flow diagram illustrating an embodiment method for implementing anti-theft protection in a registered mobile device 105 equipped with a biometric access module (e.g., a fingerprint scanner access module). When a user attempts to use a mobile device 105 equipped with a biometric access module, the user must first provide biometric information before being able to access the programs and database of the mobile device 105. The user's biometric information, such as the user's fingerprint or voiceprint, may be received by the mobile device 105, step 700. The received biometric information is used by the mobile device processor (or a processor associated with the biometric access module) to determine whether the user is authorized to use the mobile device, test 702. The mobile device 105 may authenticate the user by comparing the received biometric data to a previously stored master biometric data or template. If the received biometric data matches that of the master biometric data or template (i.e., test 702="Yes"), user is authenticated and the mobile device 105 authorizes the user is allowed to use the mobile device 105 without restrictions, step 704.

However, if the received biometric data does not match the master biometric data (i.e., test 702="No"), the mobile device 105 may determine whether the owner has reported the mobile device 105 as lost or stolen, test 706. To determine whether the mobile device 105 is reported lost or stolen, the mobile device 105 may, for example, send a message to the anti-theft service database server 120 inquiring about its status. If mobile device has received no know messages instructing it to activate the anti-theft software module (i.e., test 706="No"), the mobile device 105 may allow the user full access to the programs and databases of the mobile device 105, step 704. Alternatively, the mobile device 105 may activate the anti-theft software module, step 707, and only allow the user limited access to the programs and databases of the mobile device 105, step 708. Alternatively, the mobile device 105 may activate the anti-theft software module, step 709, and block all access to any unauthorized user, step 710. The specific alternative that is implemented by a mobile device 105 in this circumstance may be controlled by user settings. For example, the user may configure the mobile device software to err on the side of caution by either enabling limited use (i.e., implementing step 708) or blocking all use (i.e., implementing step 710) if an unauthorized person attempts to use the mobile device. If the mobile device enters a mode of restricted or block access, unauthorized user can restore them device to normal operations simply by reentering valid biometric data via the biometric access module.

If the user has reported to the anti-theft service database server 120 that the mobile device has been lost or stolen, and anti-theft activation message will have been transmitted and received by the mobile device (i.e., test 706="Yes"). In that case, the mobile device 105 may activate the anti-theft software module, step 712, providing restricted access to the programs and data on the mobile device 105 while collecting biometric and non-biometric data, step 714. Without the knowledge of the unauthorized user, the mobile device 105 may established a data connection to the anti-theft service database server 120, step 716, and transmit the collected data to the anti-theft service database server 120, step 718. The transmitted data then may be used by authorities to begin a search to retrieve the mobile device 105.

Figure 8:
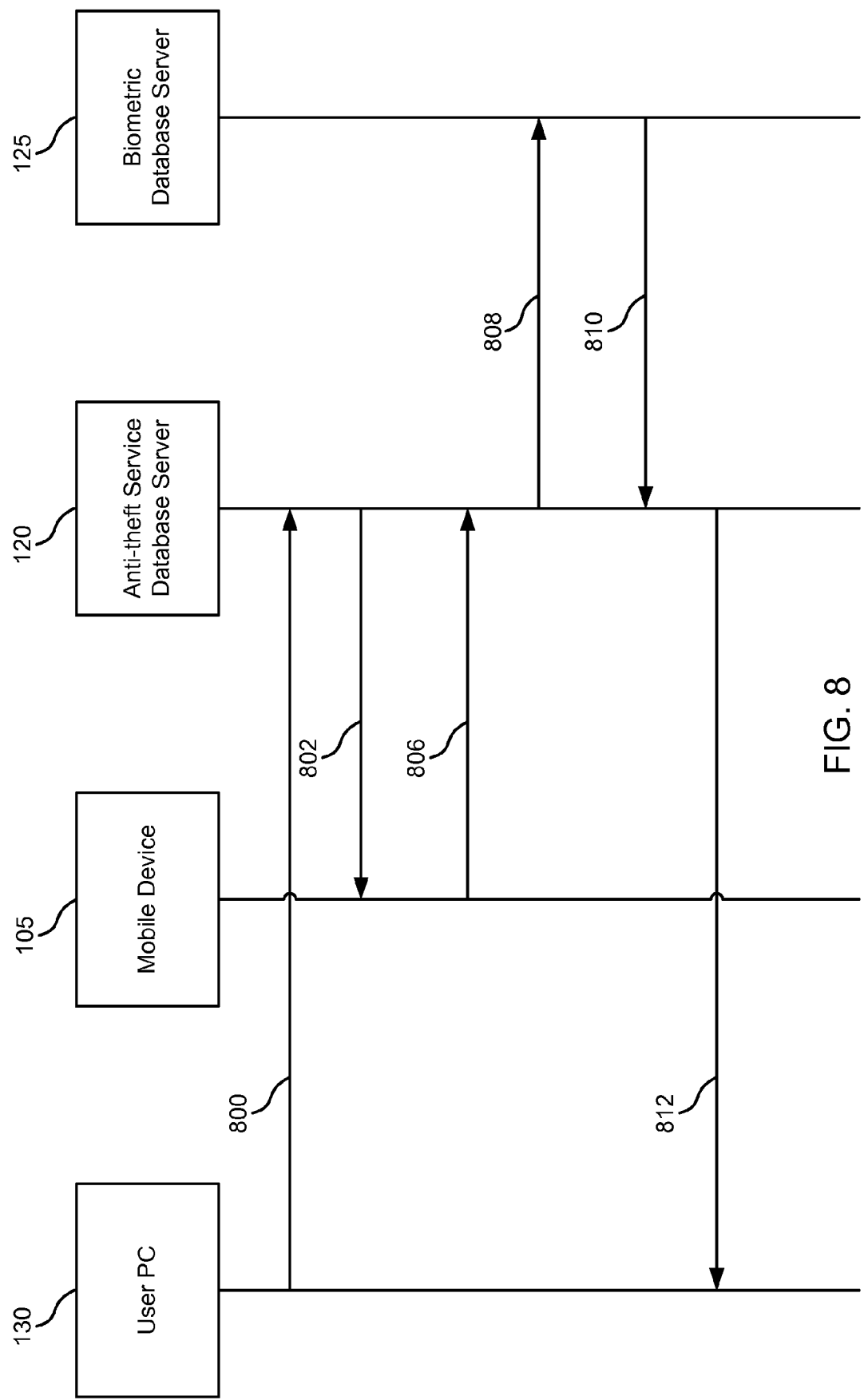
FIG. 8 is a message flow diagram of communications implemented in an embodiment.

In an embodiment, the process steps involved in transmitting collected biometric data and identifying thieves of mobile devices 105 may be implemented in a number of electronic messages passed among the different components of the anti-theft systems, such as illustrated in FIG. 8. As described above with reference to FIG. 4, users may use a personal computer 130 to report the loss or theft of a mobile device 105 to the anti-theft service database server 120 by sending messages via the Internet, message step 800, using, for example, a secured website portal. The anti-theft service database server 120 may update the data record associated with the identified mobile device to indicate that the mobile device 105 is lost or stolen. The anti-theft service database server 120 may automatically or upon request inform the mobile device 105 that it has been lost or stolen by sending an anti-theft activation message, message step 802. Upon receipt of the anti-theft activation message, the mobile device 105 may activate the stolen mobile software module. When unauthorized users try to use the mobile device 105 by inputting biometric or non-biometric data, the data is collected and transmitted to the anti-theft service database server 120, message step 806. The anti-theft service database server 120 receives the transmitted data, stores the data and may transmit the biometric data to a biometric database server 125, message step 808. The biometric database server 125 searches its database to find a match for the received biometric data. The result of the match, either positive or negative, is then sent to the anti-theft service database server 120, message step 810. Finally, the anti-theft service database server 120 may send a message to the user's PC informing the user when the mobile device has been located, message 812.

Figure 9:
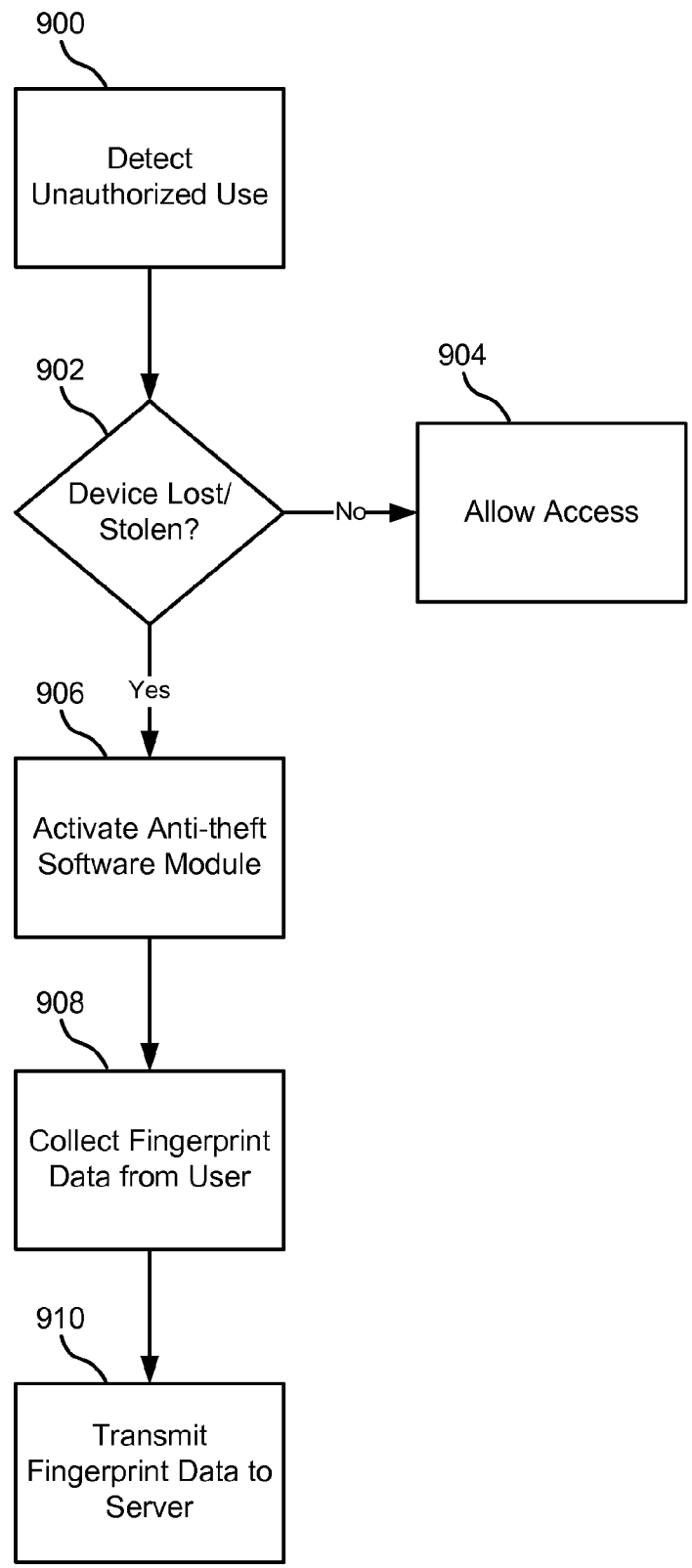
FIG. 9 is a process flow diagram of an embodiment method suitable for collecting and reporting data using a mobile device equipped with a fingerprint scanner module.

FIGS. 9-12 illustrate exemplary embodiment methods which may be implemented in the anti-left software module to locate lost or stolen mobile devices and assist in apprehending thieves. FIG. 9 is a process flow diagram illustrating an embodiment method for identifying thieves of mobile devices 105 which are equipped with a fingerprint access module. In such mobile devices any fingerprint data that does not match the master fingerprint of the authorized user may be considered unauthorized. Once the mobile device 105 detects an unauthorized use by determining that an entered fingerprint image does not match the master fingerprint, step 900, the mobile device processor determines whether a lost or theft report has been reported to the anti-theft service database server 120, test 902. If the owner has not reported that the mobile device 105 has been lost or stolen (i.e., test 902="No"), the mobile device 105 may allow unrestricted access to the user, step 904. If the owner has reported that the mobile device 105 has been lost or stolen (i.e., step 902="Yes"), the mobile device 105 may activate the anti-theft software module, step 906, to protect the data of the mobile device 105, while allowing limited use of the mobile device 105 and collecting information from the unauthorized user. For example, the mobile device 105 may collect or store the fingerprint data from the user, step 908, and transmit that data to the anti-theft service database server 120, step 910. The anti-theft service database server 120 in turn may transmit the fingerprint data to a fingerprint database, such as fingerprint database maintained by the FBI, and designated authorities to begin an investigation to identify the thief of the device.

In a modification to the embodiment illustrated in FIG. 9, if the mobile device 105 detects an unauthorized use, step 900, and the owner has not reported that the mobile device 105 has been lost or stolen (i.e., test 902="No"), the mobile device 105 may allow the unauthorized user to use the mobile device, step 904, while also activating the anti-theft software module, step 906, and collecting or storing fingerprint data, step 908. In this embodiment, the collected fingerprint data, as well as other parameter values and biometric data, may be stored in memory so that if an anti-theft activation message (or other indication that the mobile device is in fact lost or stolen) is subsequently received, that store data can be immediately transmitted to the anti-that service database server 120, step 910. If after a period of time no anti-theft activation message is received or if a subsequent fingerprint scan is matched to the user's master fingerprint, the stored collected fingerprint data may be deleted from memory and the mobile device returned to normal operation (e.g., de-activating the anti-theft software module).

Figure 10:
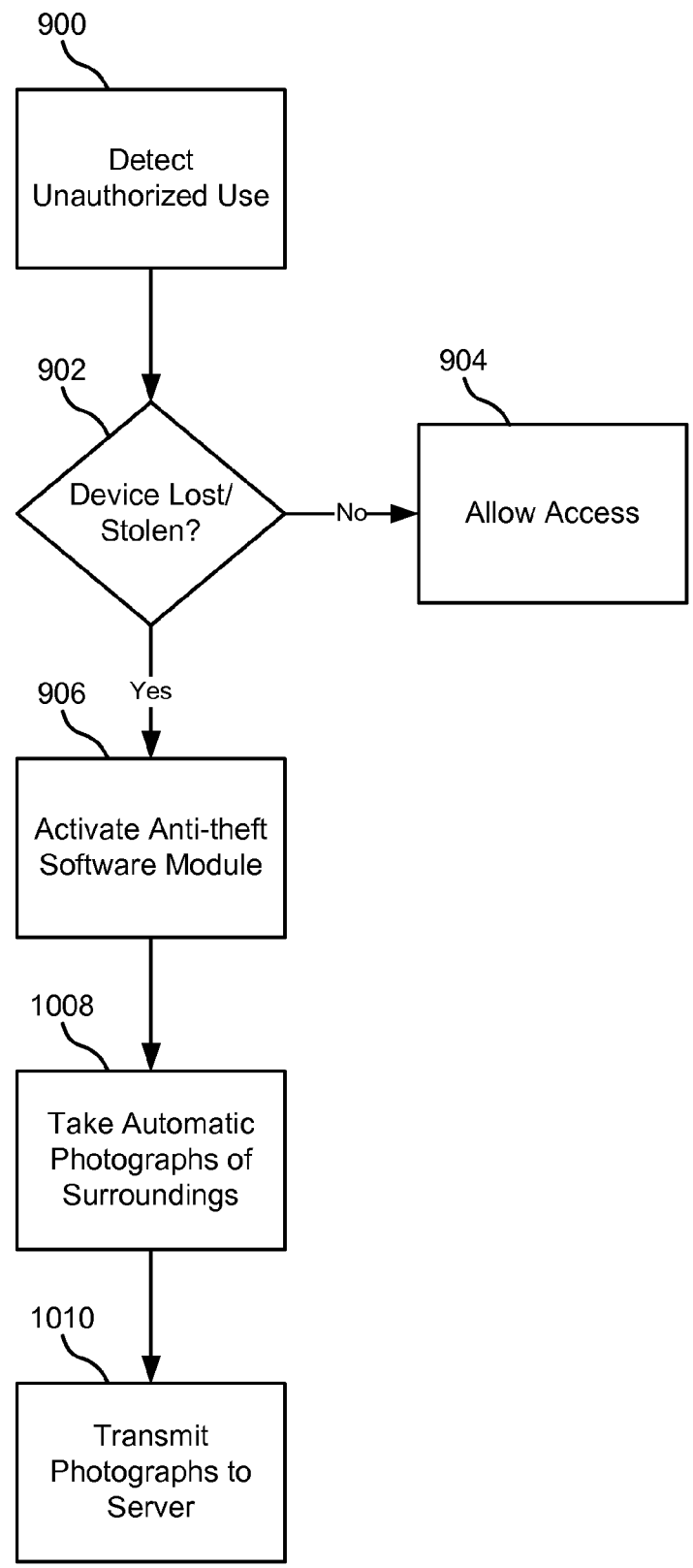
FIG. 10 is a message flow diagram of communications implemented in an embodiment method for collecting and transmitting image data from a mobile device equipped with a camera.

FIG. 10 is a process flow diagram illustrating an embodiment method for identifying thieves of mobile devices 105 which are equipped with a camera. In mobile devices 105 not equipped with biometric access modules, a PIN or password may be used to protect the contents of the mobile device 105 from unauthorized use. In such an embodiment, before a mobile device can be used, a user must first enter a PIN or password. If the mobile device 105 receives an incorrect password, it may determine that an unauthorized user is trying to access the mobile device, step 900. The mobile device 105 may then determine whether the owner has reported the mobile device 105 lost or stolen, test 902. If the mobile device 105 has not been reported lost or stolen (i.e., test 902="No") the mobile device 105 may provide access to the user, step 904. If the mobile device 105 has been reported stolen (i.e., test 902="Yes"), the mobile device 105 may activate the anti-theft software module, step 906. The mobile device 105 may then begin taking random photographs of the surroundings, step 1008, without the knowledge of the unauthorized user. The photographs may be sent to the anti-theft service database server 120 periodically or near-continuously, step 1010. The frequency at which the photographs are taken and the periodicity of transmissions to the anti-theft service database server 120 may be specified in the anti-theft activation message so that users and investigators can gather such data as required by an investigation or reduce power draw on the mobile device battery. Once the collected photographs have been received by the anti-theft service database server 120 they may be used in investigating and identifying the thief of the mobile device 105.

In a modification to the embodiment illustrated in FIG. 10, if the mobile device 105 detects an unauthorized use, step 900, and the owner has not reported that the mobile device 105 has been lost or stolen (i.e., test 902="No"), the mobile device 105 may allow the unauthorized user to use the mobile device, step 904, while also activating the anti-theft software module, step 906, and taking random photographs, step 1008. In this embodiment, the collected photograph data, as well as other parameter values, may be stored in memory so that if an anti-theft activation message (or other indication that the mobile device is in fact lost or stolen) is subsequently received, that store photographs can be immediately transmitted to the anti-that service database server 120, step 1010. If after a period of time no anti-theft activation message is received or if a proper PIN or password is subsequently entered, the stored photographs and other collected data may be deleted from memory and the mobile device returned to normal operation (e.g., de-activating the anti-theft software module).

Figure 11:
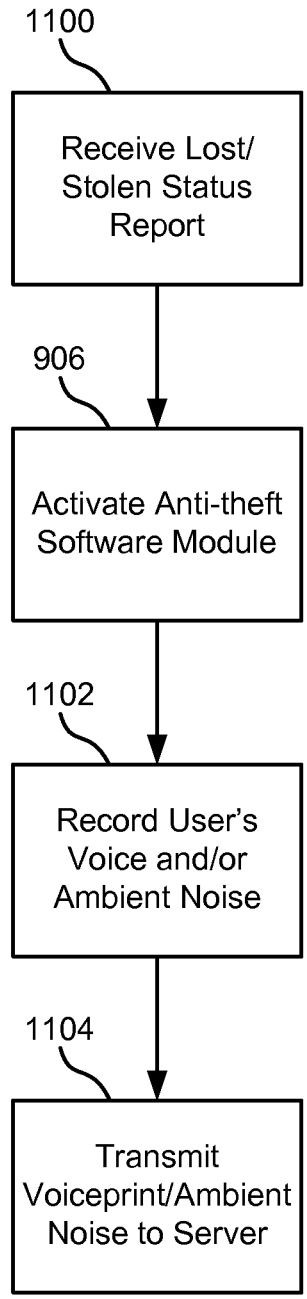
FIG. 11 is a process flow diagram of an embodiment method suitable for collecting and transmitting audio data.

FIG. 11 is a process flow diagram illustrating embodiment steps involved in identifying thieves of mobile devices 105 using voice and ambient noise recordings. Some mobile devices 105 may not be equipped with biometric access control or password input module to provide a primary layer of protection from unauthorized access. In such cases, the mobile device 105 may receive an anti-theft activation message from the anti-theft service database server 120 when the mobile device 105 is reported lost or stolen, step 1100 and, in response, activate the anti-theft software module, step 906. Upon activation of the anti-theft software module, the mobile device 105 may begin recording the user's voice, step 1102. Such recordings may be made while the current user engages in a telephone call (i.e., the mobile device telephone function is used). If a telephone function is not available (as when the mobile device 105 is not a mobile telephone) or is not being used, the mobile device processor may be configured to recognize human speech sounds and begin recording when speech is recognized and is above a threshold volume as would indicate the speaker is holding or very near the mobile device 105. Additionally, the mobile device 105 may record ambient noise when the user is not using the mobile device 105, step 1102. Such voice and ambient noise recording data may be transmitted to the anti-theft service database server 120, step 1104, for processing and investigation. Such audio data transmissions may be made periodically or near-continuously. The frequency at which the sound recordings are made and the periodicity of transmissions to the anti-theft service database server 120 may be specified in the anti-theft activation message so that users and investigators can gather such data as required by an investigation or reduce power draw on the mobile device battery. Voice recordings received at the anti-theft service database server 120 may be forwarded to a voiceprint database server for analysis. In such analysis, the voice recording may be processed to generate a voice print, such as by recognizing a word or phrase used in generating reference voice prints and generating a voice print of the word or phrase. The word or phrase may be recognized using known voice recognition software, and the voiceprint may be generated using well known methods and software. The generation of the voiceprint may be performed in the anti-theft service database server 120 or in the voiceprint database server. The generated voiceprint may then be compared to a database of voiceprints of known individuals to determine if there is a match.

Figure 12:
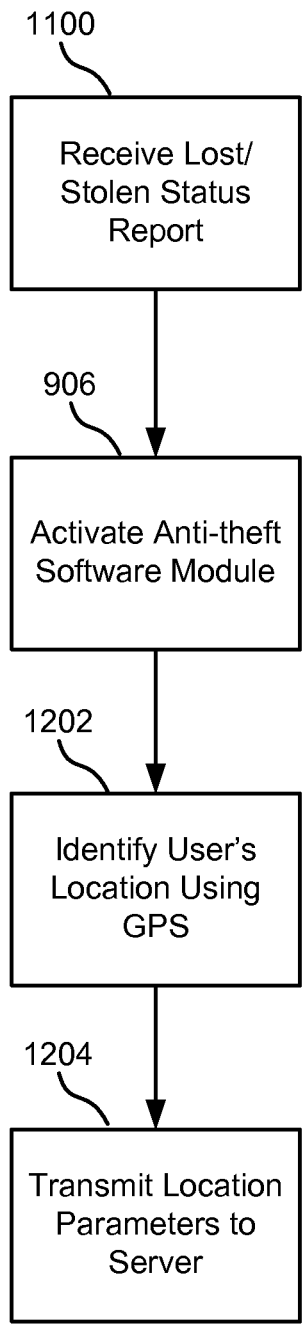
FIG. 12 is a process flow diagram of an embodiment method suitable for collecting and transmitting GPS data.

FIG. 12 is a process flow diagram illustrating embodiment steps involved in identifying thieves of mobile devices 105 equipped with a GPS receiver. When a mobile device 105 receives an anti-theft activation message from the anti-theft service database server 120 indicating that the mobile device 105 has been reported lost or stolen, step 1100, the mobile device 105 may activate the anti-theft software module, step 906, to protect the data of the mobile device 105. Upon activation of the anti-theft software module, the mobile device 105 may identify the user's location using information from its GPS receiver, step 1202. If the GPS receiver is not activated, the anti-theft software module may activate the receiver, determine when the receiver has acquired position data, and then store the position data in memory. The mobile device's location data may then be transmitted to the anti-theft service database server 120, step 1204, for processing and investigation. The mobile device 105 may send location data to the anti-theft service database server 120 periodically or near-continuously. The frequency at which the position data is obtained from the GPS receiver and the periodicity of transmissions to the anti-theft service database server 120 may be specified in the anti-theft activation message so that users and investigators can gather such data as required by an investigation or reduce power draw on the mobile device battery. For example, the mobile device may be commanded in the anti-theft activation message continuously report the GPS data to provide authorities with the exact location of the mobile device 105 at all times. Combining the GPS system with other biometric and non-biometric data that may be collected by the mobile device 105 may allow the authorities to locate and possibly identify the unauthorized user of the mobile device 105.

Figure 13:
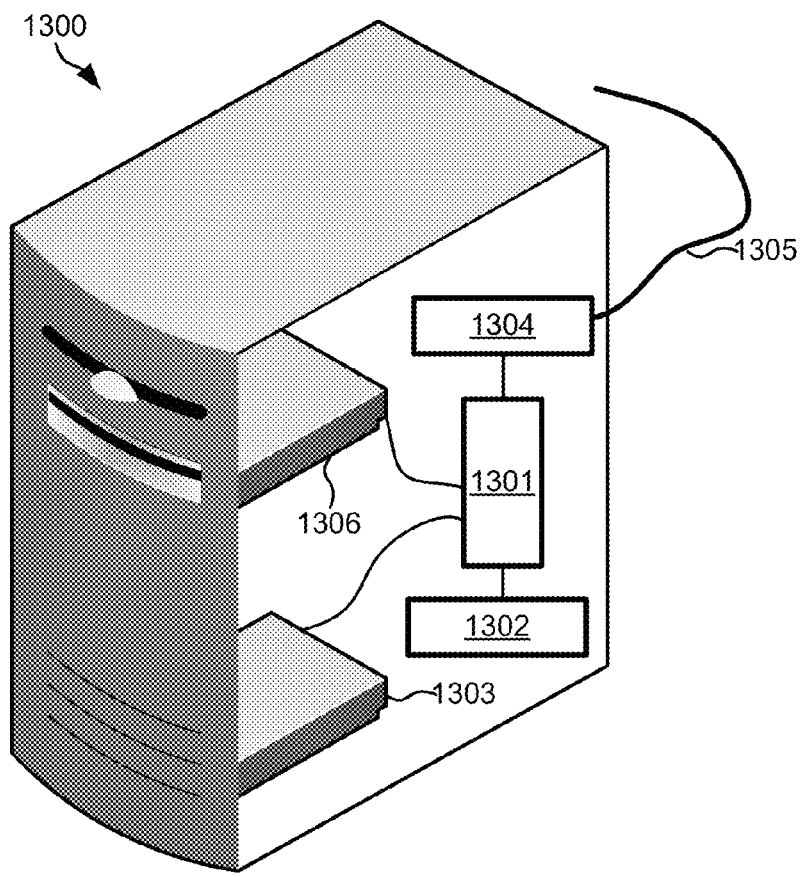
FIG. 13 is a component block diagram of a server suitable for use with the various embodiments.

The embodiments described above involving servers may be implemented on any of a variety of commercially available server systems an example of which is illustrated in FIG. 13. Such a server 1300 typically includes a processor 1301 coupled to volatile memory 1302 and a large capacity non-volatile memory, such as a disk drive 1303. The processor 1301 is coupled to one or more network interface circuits, such as high speed modems 1304 coupled to a network 1305, such as the Internet. The server 1300 may also include a portable media reader, such as a compact disc (CD) drive 1306, coupled to the processor 1301.

The various embodiments may be implemented by a computer processor 1301 executing software instructions configured to implement one or more of the described methods. Such software instructions may be stored in memory 1302, 1303 as separate applications, or as compiled software implementing an embodiment method. Mobile device registration and user authentication credential databases may be stored within internal memory 1302, in hard disc memory 1303, on tangible storage medium or on servers accessible via a network (not shown). Further, the software instructions and databases may be stored on any form of tangible processor-readable memory, including: a random access memory 1302, hard disc memory 1303, a floppy disc (readable in a floppy disc drive 1306), a compact disc (readable in a CD drive 1306), read only memory, FLASH memory, electrically erasable programmable read only memory (EEPROM), and/or a memory module (not shown) plugged into the server 1300, such as an external memory chip or a USB-connectable external memory (e.g., a "flash drive").

Figure 14:
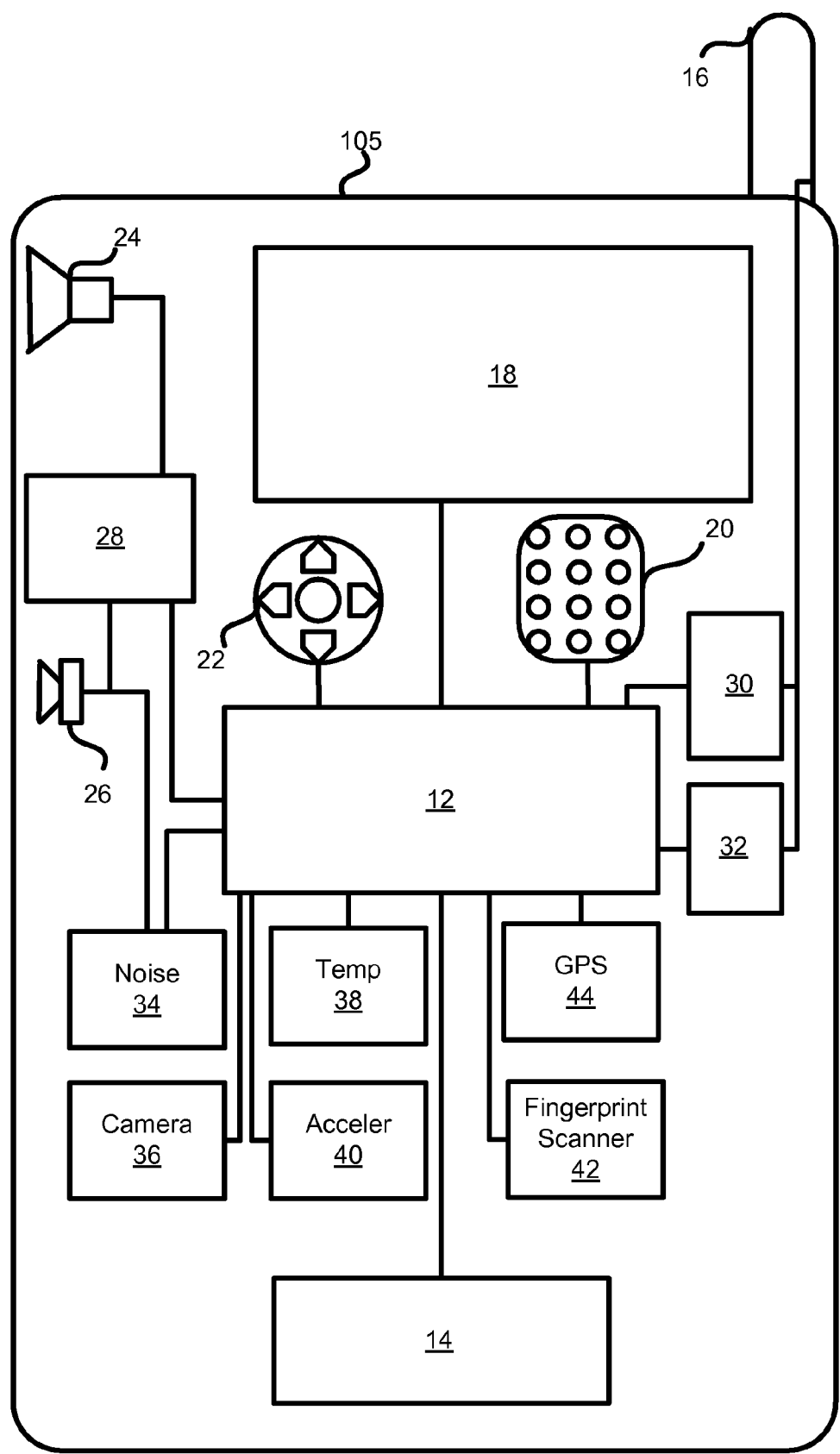
FIG. 14 is a component block diagram of a mobile device suitable for use with the various embodiments.

FIG. 14 illustrates a system block diagram of a mobile device 105 for use in the various embodiments. As shown in FIG. 14, a mobile device 105 may include a microprocessor 12, a memory 14, an antenna 16, a display 18, an alphanumeric keypad 20, a 4-way menu selector key or rocker switch 22, a speaker 24, a microphone 26, a vocoder 28, a wireless network transceiver 30, and various interconnections. Some mobile devices 105 may include a finger print scanner module 42 for imaging or scanning a user's fingerprint. In addition, mobile device 10 may contain an ambient noise sensor 34 which may include a microphone or may be connected to the mobile device's microphone 26 to detect ambient noise. Mobile devices 105 may also include a camera 36 which can be configured to be capable of taking pictures in response to commands from the anti-theft software module when a camera application is not activated. The mobile device 105 may include a GPS receiver circuit 44 which is capable of detecting the precise global position of the mobile device 105. The mobile device 105 may also include other sensors suitable for recording information relevant to a mobile device's location and use, such as an ambient temperature sensor 38 and an accelerometer 40 which may detect the relative acceleration of the mobile device 105. Additional biometric sensors, such as a retinal scanner, palm reader, blood pressure monitor, pulse rate, body temperature, etc. may also be incorporated.

The processor 12 may be any programmable microprocessor, microcomputer or multiple processor chip or chips that can be configured by software instructions (applications) to perform a variety of functions, including the functions of the various embodiments described above. In some mobile devices, multiple processors 12 may be provided, such as one processor dedicated to wireless communication functions and one processor dedicated to running other applications. Typically, software applications may be stored in the internal memory 14 before they are accessed and loaded into the processor 12. In some mobile devices, the processor 28 may include internal memory sufficient to store the application software instructions. For the purposes of this description, the term memory refers to all memory accessible by the processor 12, including internal memory 14 and memory within the processor 12 itself. The memory 14 may be volatile or non-volatile memory, such as flash memory, or a mixture of both.

The various embodiments may be implemented by the processor 12 executing software instructions configured to implement one or more of the described methods. Such software instructions, including the anti-theft software module, may be stored in memory 14 as the device's operating system software, a series of APIs implemented by the operating system, or as compiled software implementing an embodiment method. As mention above, the anti-theft software module may also be store within firmware, such as within firmware of the processor 12. Further, the software instructions may be stored on any form of tangible processor-readable memory, including: a random access memory 14, a memory module plugged into the mobile device 105, such as an SD memory chip, an external memory chip such as a USB-connectable external memory (e.g., a "flash drive"), read only memory (such as an EEPROM); hard disc memory, a floppy disc, and/or a compact disc.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

The hardware used to implement the foregoing embodiments may be processing elements and memory elements configured to execute a set of instructions, including microprocessor units, microcomputer units, programmable floating point gate arrays (FPGA), and application specific integrated circuits (ASIC) as would be appreciated by one of skill in the art, wherein the set of instructions are for performing method steps corresponding to the above methods. Alternatively, some steps or methods may be performed by circuitry that is specific to a given function.

It is well known in the art that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

I claim:

1. A method for recovering a mobile device, comprising:
   presenting a standard user interface on the mobile device during normal authorized operation;
   activating an anti-theft software module;
   presenting a secondary user interface on the mobile device when the anti-theft software module is activated, wherein the secondary interface limits access to select programs and data stored on the mobile device, and wherein the secondary user interface provides an appearance of the standard user interface on the mobile device;

collecting biometric data of an unauthorized user of the mobile device when the anti-theft software module is activated; and transmitting the collected biometric data to a server, wherein the biometric data is compared to records in a biometric database to identify the unauthorized user.

2. The method of claim 1 wherein the step of activating an anti-theft software module is performed in response to receiving instructions to activate the anti-theft software module.

3. The method of claim 1, wherein the collected biometric data includes fingerprint data.

4. The method of claim 1, wherein the collected biometric data includes voice recording data of the unauthorized user.

5. The method of claim 1, wherein the collected biometric data includes retinal scan data.

6. The method of claim 1, further comprising:
collecting non-biometric data; and
transmitting the collected non-biometric data to the server.

7. The method of claim 6, wherein the collected non-biometric data includes sound data.

8. The method of claim 6, wherein the collected non-biometric data includes location parameters.

9. The method of claim 1, wherein the steps of collecting biometric data and transmitting the collected biometric data to a server are performed without visible indication that might alert the unauthorized user.

10. The method of claim 1, wherein the collected biometric data is transmitted to the server via a cellular wireless data network.

11. A mobile device, comprising:
a processor; and
a memory coupled to the processor;
wherein the processor is configured with processor-executable instructions to perform operations comprising:
presenting a standard user interface on the mobile device during normal authorized operation;
activating an anti-theft software module;
presenting a secondary user interface on the mobile device when the anti-theft software module is activated, wherein the secondary interface limits access to select programs and data stored on the mobile device, and wherein the secondary user interface provides an appearance of the standard user interface on the mobile device;
collecting biometric data of an unauthorized user of the mobile device when the anti-theft software module is activated; and
transmitting the collected biometric data to a server, wherein the biometric data is compared to records in a biometric database to identify the unauthorized user.

12. The mobile device of claim 11, further comprising a biometric access module.

13. The mobile device of claim 11, further comprising a sensor configured to collect non-biometric data.

14. The mobile device of claim 11, wherein the processor is configured with processor-executable instructions to perform operations further comprising:
receiving instructions to activate the anti-theft software module; and
activating the anti-theft software module is performed in response to receiving instructions to activate the anti-theft software module.

15. The mobile device of claim 11, further comprising a fingerprint scanner coupled to the processor,
wherein the processor is configured with processor-executable instructions such that:
collecting biometric data comprises collecting fingerprint data; and
transmitting the collected biometric data to the server comprises transmitting the collected fingerprint data to the server.

16. The mobile device of claim 11, further comprising a microphone coupled to the processor,
wherein the processor is configured with processor-executable instructions such that:
collecting biometric information comprises collecting voice recording data of the unauthorized user of the mobile device; and
transmitting the collected biometric information to the server comprises transmitting the collected voice recording data to the server.

17. The mobile device of claim 11, further comprising a retinal scanner coupled to the processor,
wherein the processor is configured with processor-executable instructions such that:
collecting biometric data comprises collecting retinal scan data; and
transmitting the collected biometric data to the server comprises transmitting the collected retinal scan data to the server.

18. The mobile device of claim 11, wherein the processor is configured with processor-executable instructions to perform operations further comprising:
collecting non-biometric data; and
transmitting the collected non-biometric data to the server.

19. The mobile device of claim 18, further comprising a GPS receiver coupled to the processor,
wherein the processor is configured with processor-executable instructions such that:
collecting non-biometric data comprises collecting GPS location data; and
transmitting the collected non-biometric data to the server comprises—transmitting the collected GPS location data to the server.

20. The mobile device of claim 11, wherein the processor is configured with processor-executable instructions such that the operations of collecting biometric data and transmitting the collected biometric data to a server are performed without visible indication that might alert the unauthorized user.

21. The method of claim 11, further comprising a cellular wireless network transceiver coupled to the processor, the wireless network transceiver being configured to establish a communication link with a cellular wireless network,
wherein the collected biometric data is transmitted to the server via the communication link to the cellular wireless data network.

22. A mobile device, comprising:
means for presenting a standard user interface on the mobile device during normal authorized operation;
means for activating an anti-theft software module;
means for presenting a secondary user interface on the mobile device when the anti-theft software module is activated, wherein the secondary interface limits access to select programs and data stored on the mobile device, and wherein the secondary user interface provides an appearance of the standard user interface on the mobile device;

means for collecting biometric data of an unauthorized user of the mobile device when the anti-theft software module is activated; and
means for transmitting the collected biometric data to a server, wherein the biometric data is compared to records in a biometric database to identify the unauthorized user.

23. The mobile device of claim 22, further comprising means for receiving instructions to activate the anti-theft software module.

24. The mobile device of claim 22, further comprising:
means for collecting non-biometric data; and
means for transmitting the collected non-biometric data to the server.

25. The mobile device of claim 22, wherein:
means for collecting biometric data comprises means for collecting fingerprint data; and
means for transmitting the collected biometric data to the server comprises means for transmitting fingerprint data to the server.

26. The mobile device of claim 22, wherein:
means for collecting biometric data comprises means for recording voice data of the unauthorized user; and
means for transmitting the collected biometric data to the server comprises means for transmitting recorded voice data to the server.

27. The mobile device of claim 22, wherein:
means for collecting biometric data comprises means for obtaining retinal scan data; and
means for transmitting the collected biometric data to the server comprises means for transmitting retinal scan data to the server.

28. The mobile device of claim 24, wherein:
means for collecting non-biometric data comprises means for collecting location data; and
means for transmitting the collected non-biometric data to the server comprises means for transmitting location data to the server.

29. The mobile device of claim 22, wherein:
means for collecting biometric data comprises means for collecting data without a visible indication that might alert the unauthorized user; and
means for transmitting the collected biometric data to the server comprises means for transmitting collected data to the server without a visible indication that might alert the unauthorized user.

30. The mobile device of claim 22, wherein means for transmitting the collected biometric data to the server comprises means for transmitting the collected biometric data via a cellular wireless data network.

31. A non-transitory storage medium having stored thereon processor-executable software instructions that would cause a processor of a mobile device to perform operations comprising:
presenting a standard user interface on the mobile device during normal authorized operation;
activating an anti-theft software module;
presenting a secondary user interface on the mobile device when the anti-theft software module is activated, wherein the secondary interface limits access to select programs and data stored on the mobile device, and wherein the secondary user interface provides an appearance of the standard user interface on the mobile device;
collecting biometric data of an unauthorized user of the mobile device when the anti-theft software module is activated; and
transmitting the collected biometric data to a server, wherein the biometric data is compared to records in a biometric database to identify the unauthorized user.

32. The non-transitory storage medium of claim 31, wherein the stored processor-executable instructions are configured to cause the processor of the mobile device to perform operations further comprising:
receiving instructions to activate the anti-theft software module; and
activating the anti-theft software module in response to receiving instructions to activate the anti-theft software module.

33. The non-transitory storage medium of claim 31, wherein the stored processor-executable instructions are configured to cause the processor of the mobile device to perform operations such that:
collecting biometric data comprises collecting fingerprint data; and
transmitting the biometric data to the server comprises transmitting the collected fingerprint data to the server.

34. The non-transitory storage medium of claim 31, wherein the stored processor-executable instructions are configured to cause the processor of the mobile device to perform operations such that:
collecting biometric data comprises collecting voice recording data from the unauthorized user; and
transmitting the collected biometric data to the server comprises transmitting the collected voice recording data to the server.

35. The non-transitory storage medium of claim 31, wherein the stored processor-executable instructions are configured to cause the processor of the mobile device to perform operations such that:
collecting biometric data comprises collecting retinal scan data; and
transmitting the collected biometric data to the server comprises transmitting the collected retinal scan data to the server.

36. The non-transitory storage medium of claim 31, wherein the stored processor-executable instructions are configured to cause the processor of the mobile device to perform operations such that:
collecting non-biometric data comprises collecting GPS location data; and
transmitting the collected non-biometric data to the server comprises transmitting the collected GPS location data to the server.

37. The non-transitory storage medium of claim 31, wherein the stored processor-executable instructions are configured to cause the processor of the mobile device to perform operations such that collecting biometric data and transmitting the collected biometric data to a server are performed without visible indication that might alert the unauthorized user.

38. The non-transitory storage medium of claim 31, wherein the stored processor-executable instructions are configured to cause the processor of the mobile device to perform operations such that transmitting the collected biometric data to a first server transmits the collected data to the server via a cellular wireless data network.

* * * * *